United States Patent
Bolourchi

(10) Patent No.: US 7,719,431 B2
(45) Date of Patent: May 18, 2010

(54) SYSTEMS, METHODS AND COMPUTER PRODUCTS FOR DROWSY DRIVER DETECTION AND RESPONSE

(75) Inventor: Farhad Bolourchi, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 258 days.

(21) Appl. No.: 11/868,193

(22) Filed: Oct. 5, 2007

(65) Prior Publication Data

US 2009/0091435 A1    Apr. 9, 2009

(51) Int. Cl.
    *G08B 23/00*    (2006.01)
    *B60Q 1/00*    (2006.01)

(52) U.S. Cl. .................... 340/576; 340/575; 340/439

(58) Field of Classification Search ............ 340/575, 340/576
See application file for complete search history.

(56) References Cited

U.S. PATENT DOCUMENTS

| | | | |
|---|---|---|---|
| 4,348,652 A * | 9/1982 | Barnes et al. ............... | 340/904 |
| 4,594,543 A | 6/1986 | Eriksson et al. | |
| 5,813,993 A | 9/1998 | Kaplan et al. | |
| 5,900,819 A | 5/1999 | Kyrtsos | |
| 6,130,617 A | 10/2000 | Yeo | |
| 6,243,015 B1 | 6/2001 | Yeo | |
| 6,426,702 B1 | 7/2002 | Young et al. | |
| 6,493,669 B1 | 12/2002 | Curry et al. | |
| 6,590,499 B1 | 7/2003 | D'Agosto | |
| 6,614,469 B1 * | 9/2003 | Kato et al. ................... | 348/148 |
| 6,724,920 B1 | 4/2004 | Berenz et al. | |
| 6,748,302 B2 * | 6/2004 | Kawazoe ........................ | 701/1 |
| 6,822,573 B2 | 11/2004 | Basir et al. | |
| 6,879,969 B2 | 4/2005 | Engatrom et al. | |
| 7,043,056 B2 | 5/2006 | Edwards et al. | |
| 7,138,922 B2 | 11/2006 | Strumolo et al. | |
| 7,164,117 B2 | 1/2007 | Breed et al. | |
| 7,183,932 B2 | 2/2007 | Bauer | |
| 7,424,357 B2 * | 9/2008 | Ozaki et al. ................... | 701/70 |
| 2004/0164851 A1 * | 8/2004 | Crawshaw .................. | 340/435 |
| 2008/0228400 A1 * | 9/2008 | Wheeler ..................... | 701/301 |

OTHER PUBLICATIONS

Fang et al., "Intelligent Transportation Systems—Challenges and Opportunities".

* cited by examiner

*Primary Examiner*—Benjamin C Lee
*Assistant Examiner*—Andrew Bee
(74) *Attorney, Agent, or Firm*—Cantor Colburn LLP

(57) ABSTRACT

Systems and methods and computer products for drowsy driver detection and response. Exemplary embodiments include systems and methods and computer products for determining that a vehicle has engaged in a lane violation, determining a severity of the lane violation, determining a drowsy driver condition of the vehicle and responding to the drowsy driver condition via onboard warning, corrective actuation, or remote human interventions.

24 Claims, 2 Drawing Sheets

SYSTEMS, METHODS AND COMPUTER PRODUCTS FOR DROWSY DRIVER DETECTION AND RESPONSE

FIELD OF THE INVENTION

The present disclosure relates generally to vehicle control systems and, more particularly, to systems and methods and computer products for drowsy driver detection and response.

BACKGROUND

A number of vehicle systems have been devised to assist the vehicle in maintaining a central position within a driving lane. Generally) a "lane keeping" (LK) system includes a device such as a video camera that gathers information on the current position of the vehicle, along with sensors for detecting certain dynamic state variables of the vehicle. Information on the deviation of the vehicle from the center of the driving lane, as well as the dynamic state variables of the vehicle, appropriate feedback indication is provided to the driver. For example, the feedback indication could be in the form of an audio signal, a visual signal, and/or a haptic signal to the driver. In addition to driver feedback, the LK system may also be integrated within the steering system of the vehicle to provide a corrective input thereto when a path deviation is detected.

However, there is no drowsy driver determination based on LK algorithms discussed above.

SUMMARY

Disclosed herein is an exemplary embodiment for a method, including determining that a vehicle has engaged in a lane violation, determining a severity of the lane violation, determining a drowsy driver condition of the vehicle and responding to the drowsy driver condition.

In another exemplary embodiment disclosed herein is a computer program product for detecting a drowsy driver condition, the computer program product including instructions for causing a computer to implement a method, the method including determining that a vehicle has engaged in a lane violation, determining a severity of the lane violation, determining a drowsy driver condition of the vehicle and responding to the drowsy driver condition.

In another exemplary embodiment disclosed herein is a system, including a computer processor, a drowsy driver detection process residing on the processor and having instructions to determine that a vehicle has engaged in a lane violation, determine a severity of the lane violation, determine a drowsy driver condition of the vehicle and respond to the drowsy driver condition.

The above-described and other features will be appreciated and understood by those skilled in the art from the following detailed description, drawings, and appended claims.

BRIEF DESCRIPTION OF THE DRAWINGS

Refer now to the figures, which are meant to be exemplary, not limiting, and wherein the like elements are numbered alike.

DETAILED DESCRIPTION

In exemplary embodiments, algorithms for the detection of drowsy drivers are integrated with onboard warning systems, human-intervention systems and LK systems. Cameras and image recognition software are implemented to identify lane markings on various roadways and lane violations in excess of a pre-determined distance can initiate drowsy driver methods and systems as described herein. Furthermore, the cameras and image recognition software can further detect and measure the severity of a lane violation. Algorithms can further calculate a drowsiness index from the lane violation and lane violation severity data. In exemplary embodiments, the systems and methods described herein can warn a driver that a lane violation has occurred, provide a torque adjustment to compensate the lane violation, initiate a human intervention system, etc. In exemplary embodiments, the drowsiness index can be implemented to determine the types of responses from onboard warning systems and LK systems that are implemented in response to a drowsy driver condition.

The exemplary embodiments described herein may be utilized in various types of vehicles employing electronic steering or steer by wire systems or with the addition of an electric motor on a hydraulic steering system, or electric controllable hydraulic system. In exemplary embodiments, the systems and methods can be applied to an automobile employing an electric power steering system. While an exemplary embodiment is shown and described by illustration and reference to an automobile steering system, it is appreciated by those skilled in the art that the invention is not limited to the automobiles alone or may be applied to all vehicles employing electronic steering systems, steer by wire systems, or even hydraulically controlled steering systems or electric controlled hydraulically controlled steering systems where a lane keeping command may be integrated with existing steering commands.

Figure 1:
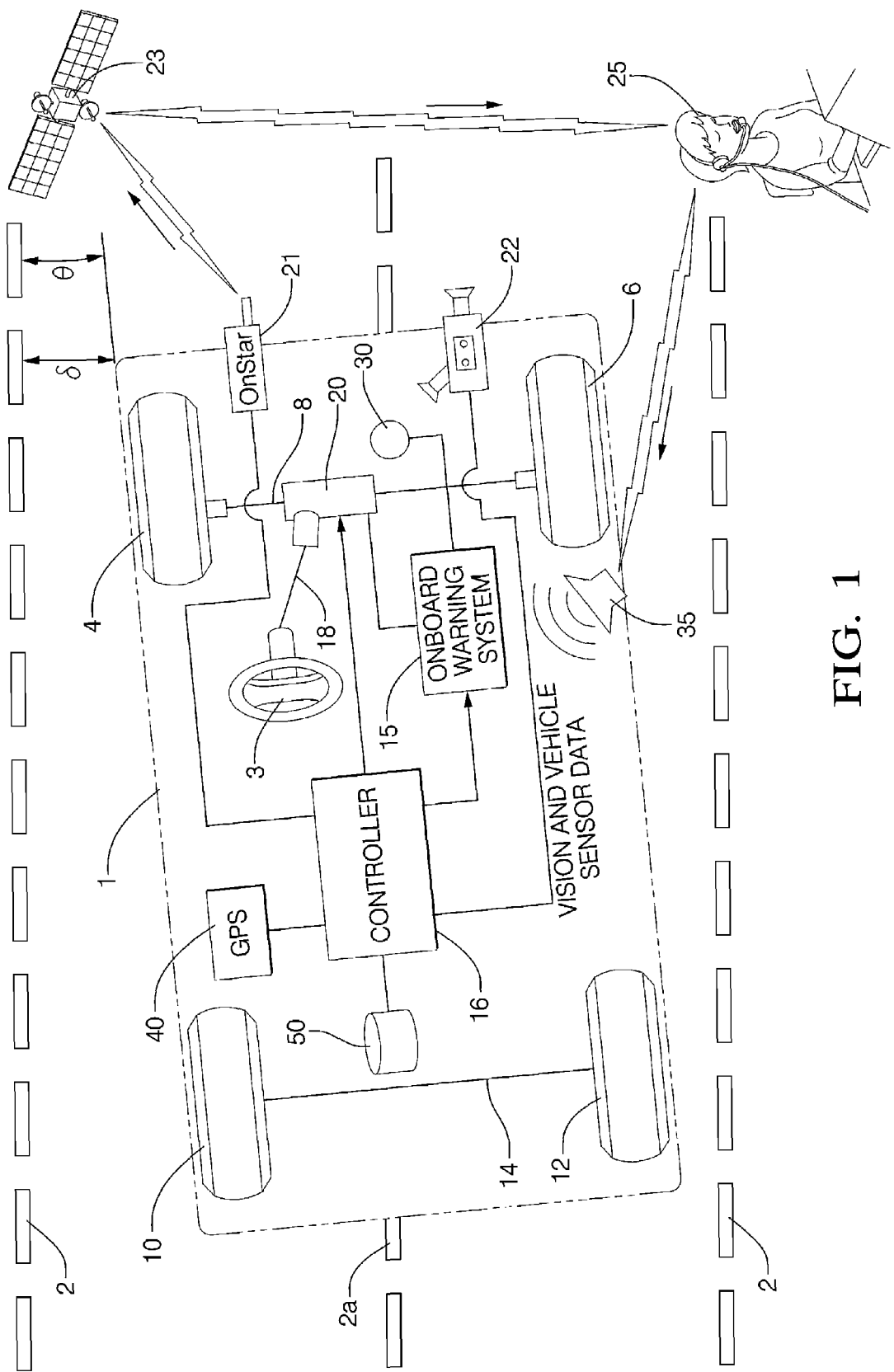
FIG. 1 illustrates a diagram of a vehicle having an exemplary drowsy driver detection system.

Referring now to FIG. 1, there is depicted a vehicle 1 in a lane with various lane markers 2 to the left and right 2, and a calculated center of lane 2, which can be calculated by various methods discussed herein. The vehicle 1 includes a handwheel 3 for controlling the angle of a left front road wheel 4 and a right front road wheel 6 in an exemplary front wheel steering configuration. The left and right front road wheels 4 and 6 are coupled through a rack and pinion steering mechanism 8. The vehicle 1 also includes a left rear road wheel 10 and a right rear road wheel 12 coupled through a rear axle 14. In exemplary embodiments, when a driver of the vehicle 1 rotates the handwheel 3, the angular position of the handwheel 3 may be determined through a handwheel angle sensor, which can be recorded by a controller 16. The handwheel 3 and the rack and pinion steering mechanism 8 may be coupled through a steering shaft 18 and a steering actuator 20. The steering actuator 20 may include an electric motor in a steering actuation system, such as AFS, EPS, SBW, ARS, or AWS. In exemplary embodiments, the steering actuator 20 is part of an EPS system. While the steering actuator 20 is depicted in FIG. 1 as distributed along the rack and pinion mechanism 8, in exemplary embodiments, the steering actuator may be positioned at other locations such as at the coupling junction between the steering shaft 18 and the rack and pinion steering mechanism 8, etc. Positional determinations of the steering actuator 20 may be determined through a motor position sensor, which may also be used to calculate the angular position of the handwheel 3.

In exemplary embodiments, the vehicle 1 also includes the controller 16 (as mentioned above), which receives input signals from various sensors on the vehicle 1 such as but not limited to a handwheel angle sensor, a motor position sensor, rack position sensors, a vehicle speed sensor, a yaw rate sensor, a lateral acceleration sensor, etc. The controller 16 may generate output signals to the steering actuator 20, such as but not limited to, feedback for torque correction, vibrations as a warning signal, etc. Although only a single controller 16 is depicted, it is understood by those skilled in the art that the controller 16 may be distributed through multiple control units within the vehicle 1. For example, there may be a local controller at the steering actuator 20 that receives vehicle information over a vehicle network from various smart sensors or a centralized control unit. As illustrated in FIG. 1, the controller 16 is operatively coupled to the steering actuator 20 for providing control signals to and receiving feedback signals from the steering actuator 20.

The vehicle sensors may include various types of technologies to produce input signals with or without additional signal conditioning and processing by the controller 16. For example, the sensors can be a resolver, a rotational variable differential transformer (RVDT), an encoder, or a potentiometer and a combination of other sensor types.

In exemplary embodiments, a vehicle speed sensor may utilize a magnetic pick-up to determine the speed of the vehicle 1. A yaw rate sensor may determine the rate of vehicle 1 yaw with a gyroscope. A lateral acceleration sensor may be an accelerometer. While vehicle sensors may be separate sensors, they may be merged into any combination of modules. Furthermore, the vehicle sensors may be integrated in any combination with the steering actuator 20 or the controller 16. Multiple sensors may be provided for redundancy or improved accuracy. In exemplary embodiments, equivalent vehicle information provided by the vehicle sensors may be extracted or synthesized from a combination of vehicle sensors, including other vehicle sensors. It is appreciated that the various vehicle sensors can be implemented to measure various operational conditions of the vehicle that can be input into the controller 16 in the determination of a drowsy driver condition as further described herein.

The vehicle 1 may further include an onboard warning system 15 coupled to the controller 16. The onboard warning system 15 may be advantageously implemented to initiate a series of signals to warn the operator of the vehicle of dangerous conditions such as a drowsy driver condition. For example, the onboard warning system 15 can be operatively coupled to a visible indicator 30 and an audible indicator 35. In the event of a drowsy driver condition, the controller 16 can provide instructions to the visible indicator 30, the audible indicator 35 or a combination thereof to alert the operator that he or she has become drowsy as indicated by the drowsy driver algorithms. In exemplary embodiments, the onboard warning system 15 can further provide tactile feedback to the steering actuator 20 to provide a warning vibration to the operator in the event of a drowsy driver condition as described above. The onboard warning system 15 can further provide similar vibrational feedback to other portions of the vehicle 1 such as the vehicle seats (not shown) as a further indication to the operator of a drowsy driver condition. It is appreciated that the onboard warning system 15 can implement any combination of the warning indicators described herein.

In exemplary embodiments, the onboard warning system 15 can further include a lane departure warning system that further provides indicators to the vehicle operator that a lane departure is occurring or is imminent. In exemplary embodiments, a lane change can be detected by detecting the discontinuity on the calculation for the center of the vehicle to the center of the lane. In an exemplary implementation, a sign change with large magnitude signals can be detected. In another exemplary implementation, the absolute value of the difference between the previous measurement and the current measurement can be compared to a maximum value that should not be exceeded unless there is a lane change condition. When the value is detected, the lane keeping system shuts off the torque immediately and remains off for a calibratable delay time, such as two seconds. Then the system can wait until the vehicle is less than a value closer to the center in the next lane, e.g. 0.3 meters, before re-enabling the torque correction. In another exemplary implementation, a delay can be used in lieu of waiting for the vehicle to be near the center of the next lane. In general, being near the center causes the least torque to be generated by the lane keeping system, while the delay assures that the vehicle has reached a steady state condition. A software algorithm, which achieves a detection/shut-off combination, can be implemented by a state machine or a triggered sub-system.

The vehicle 1 further includes a human intervention system 21 such as OnStar®, which can be operatively coupled to the onboard warning system 15 and the controller 16. The human intervention system 21 can be implemented in the event of a drowsy driver condition, such as the exceeding of a predetermined lane violation condition or in response to a severity of the lane violation or a combination thereof as discussed herein. The vehicle 1 can further include on onboard camera system 22 for reading lane markers such as lane markers 2, 2a as described in accordance with exemplary embodiments herein. As discussed herein, the camera system 22 is used to collect data about various operating conditions of the vehicle 1 such as lane departures, lane violation, severity of lane violations, etc.

As discussed above, the onboard warning system 15 can further include a lane departure warning system, which can include including a lane tracking system integrated with the steering actuator 20. The lane tracking system may include but not be limited to, the camera system 22 for detection of lane markers/markings and computing a lane position signal, coupled to the controller 16 as discussed above. The lane departure warning system can also optionally integrated with auxiliary sensors such as a global positioning system (GPS with map navigation system) 40 and dynamic sensors such as, but not limited to the handwheel angle, lateral acceleration, vehicle speed yaw rate sensor, etc., as discussed above. The lane departure warning and LK system can also be integrated with various controls and enunciators to provide indications and feedback to the operator, as discussed with respect to the onboard warning system 15.

The integration of GPS 40 may be employed for route planning and navigation. Furthermore, GPS 40 may be employed to information the lane departure warning and LK system when the vehicle 1 is approaching a defined point in the roadway, such as, an exit, but not limited thereto. Under such conditions, the lane departure warning and LK system can identify the type of lane marker 2, e.g., dashed or solid. If, for example, the right line is solid, it may be inferred that the vehicle 1 is in the right most lane. The lane departure warning and LK system switches to the left line if the route planning indicates that the intention is to continue along the present course. This switch ensures that the lane departure warning and LK system does not direct the vehicle 1 down the exit. If, on the other hand, it is intended to take the exit, the lane departure warning and LK system would be in the right lane (if it is a right exit) and track the right most lane marker 2, to direct the vehicle 1 on to the exit. As further described herein, the lane departure warning and LK system can further detect a lane violation condition, which can be indicative of a drowsy driver.

In exemplary embodiment, the drowsy driver system also includes a driver attention-monitoring device as part of a sensor on the onboard warning system 15. The driver attention-monitoring device facilitates the lane departure warning and LK system taking action when the operator's attention is not focused on the roadway. The driver attention-monitoring device informs the lane departure warning and LK system that the driver is at some level of drowsiness/inattentiveness. The driver attention monitoring device includes, but is not limited to a camera system with infrared flood (or equivalent apparatus) to monitor the status of the operator, in particular, an operator's eyes. In one exemplary embodiment the driver attention-monitoring device monitors the operator's eye(s) to ascertain a percentage eye closure. The lane departure warning and LK system may then employ such a determination by takings action and providing warnings to the operator. For example, the driver attention-monitoring device may be employed as an indicator when the driver has taken their eyes off the roadway for a duration exceeding a selected time.

When the driver attention-monitoring device ascertains that a driver is inattentive, the lane departure warning and LK system can respond with torque nudges, if the driver's hands are on the handwheel 8 (e.g., a helper (Assist) mode). In addition, audible (raising and lowering of the radio may be part of this feature) and visual warnings may be activated along with steering wheel buzz (as described herein). If the driver does not take control of the vehicle 1 or the driver attention-monitoring device does not indicate that the driver is awake, the lane keeping system may enter an Autonomous mode. The system may communicate to other systems in the vehicle 1 that the driver is not responding. As such, various audible, visual, tactile indications, etc. can be activated. The lane departure warning and LK system may be integrated with other systems such as speed control and steering to slow the vehicle 1, or pull off to the side of the road and stop. Moreover in vehicles 1 equipped with the human intervention system 21 (e.g., OnStar®, etc.) 21 capability, the OnStar® system may be activated, as discussed further below.

As such, the drowsy driver systems and methods described herein can provide two modes of operation, a helper or assist mode, and an autonomous mode, which can include initiating a human intervention system 21 such as OnStar®. In helper mode the operator is hands on, and the system provides audio warning(s) and/or tactic feedback warnings (for example, to simulate the noise/feel of a rumble strip) that indicates the vehicle is approaching the lane marker 2. The warnings and cues may be overridden by activation of a turn signal indicating operator intent to change lanes. For example, in the helper (assist) mode, because application of torque nudges can cause the vehicle 1 to dart back and forth between lane markers 2 if the driver were not controlling the steering wheel, it is desirable to determine if the drivers is, in fact holding the wheel. If so, then a torque nudge may be applied. As disclosed at a later point herein, a pressure/force sensor may be employed to determine if the driver is controlling the steering wheel.

In Autonomous mode the system is enabled after the operator has maintained the vehicle 1 within a tolerance band from the lane center for a selected period. The lane keeping system warns the operator of an impending engagement of the autonomous mode with a chime, and then engages. The autonomous mode maintains the vehicle 1 in the lane and requires no operator input to control the vehicle 1. In an exemplary embodiment, the lane departure warning and LK system employs a left marker as the primary marker but can readily transition to the right marker if the left marker cannot be identified. For example, in the autonomous mode, a torque sensor that is coupled to the controller 16 is used for determining driver intent. In this mode, the operator may want to make a correction and/or over ride the lane departure warning and LK system. As such, when the driver inputs a torque that exceeds a pre-determined value, the lane departure warning and LK system can transition to the helper (assist) mode. When the driver has completed his correction the lane departure warning and LK system transitions back to autonomous mode when the driver is within a pre-determined distance of the lane center and for a predetermined duration, when both of these conditions have been met the lane keeping system transitions back to the autonomous mode.

In exemplary embodiments, the drowsy driver detection systems and methods described herein can be configured to operate with center deviation functionality. The lane keeping system responds when the vehicle 1 deviates from the center of the lane by a selected offset. When the vehicle 1 deviates, the system activates a visual warning lamp, audible warnings, and provides a torque nudge to the operator via the steering wheel in the direction away from the lane boundary line.

In exemplary embodiments, the drowsy driver detection system can be enabled for a selected speed range of the vehicle 1. The system may be configured to operate only over a small range of total system authority and rates. In exemplary embodiments, the drowsy driver detection system can utilize ten percent of total system control authority. It is appreciated that other configurations are conceivable. It is further appreciated that the methods and systems for lane change detection and handling of lane keeping torque described herein generally are implemented during an un-signaled lane change.

Referring till to FIG. 1, a lane violation V, can be detected by the camera system 22 by detection of one of the lane markers 2. In exemplary embodiments, V=1 indicates a lane violation has occurred and V=0 indicates that no lane violation has occurred. A distance, δ, can be calculated and compared to a predetermined value. In exemplary embodiments, if δ is small compared to the predetermined value, then a lane violation has occurred, and thus V=1. As discussed above, many of the onboard tactile feedback mechanisms, such as visible and audible signals, handwheel vibrations, or a combinations of the signals can be initiated in response to a lane violation. As further discussed above, the lane departure warning and LK system can be activated to provide a torque correction to the vehicle. In exemplary embodiments, warnings can be sequential, that is, different signals can be activated sequentially depending on the severity of the lane violation. For example, if one lane violation is detected over a time interval T (discussed further herein), one of the warnings can be generated by the on board warning system 15. If further lane violations are detected over the time interval T, then an increasing number of warnings can be generated by the onboard warning system 15. It is appreciated that different frequencies, amplitudes and intensities of the warning signals can also be adjusted and increased based on the number of violations in the time interval T.

In exemplary embodiments, the drowsy driver detection system can also measure a severity, S, of the lane violation V. As discussed above, a lane violation is said to have occurred if the distance δ from the lane marker 2 falls below a predetermined distance from the lane marker 2. In exemplary embodiments, the severity of the lane violation can be determined by analyzing the incident angle θ to the lane marker 2. In exemplary embodiments, the greater the incident angle θ (or if the incident angle θ exceeds a predetermined threshold, or if the rate of change of the incident angle θ exceeds a predetermined rate of change, etc.), the greater the severity, S, of the lane violation.

It is appreciated that the angle of incidence θ is provided by the camera system 22 and can be calculated in a variety of ways known in the art. As such the distance δ and the angle of incidence θ can be calculated as part of the processing of the particular image of the roadway as captured by the camera system 22 and processed in the processor 16. In exemplary embodiments, the distance δ and the angle of incidence θ are provided relative to the position of the vehicle 1 currently (near field) as well as a distance ahead (far field). For example, if a lane violation is happening at the near field because the car is too far to the left, the severity can be reduced, if the road ahead is turning to the left (as indicated by the δ and heading angle signals for the far field).

In exemplary embodiments, the occurrences of lane violations can be summed over a time internal T, and a drowsiness index D, can be determined as follows:

$$D = \sum_i^T Vi * Si$$

As discussed above, for a lane violation V, a given $V_i$ can be 1 or 0. Furthermore, $S_i$ can be some non-zero number (or absolute value of a negative number). In exemplary embodiments, a non-severe or nonexistent lane violation may be considered S=0. In exemplary embodiments, the greater the non-zero number $S_i$, the greater the severity of the lane violation is considered. For example, if the incident angle is approximately θ=0° (0 radians), then it is appreciated that the vehicle 1 is approximately parallel to one or more of the lane markers 2, and no violation is in progress, thus, the severity, S, for that reading can be considered S=0 or a low number (e.g. 1 on a scale of 0 to 10). In a further example, a severe lane violation can be considered θ=90° (π/2 radians), in which the vehicle is approximately perpendicular to one or more of the lane makers 2. In such an instance, the severity, S, could be measured as a maximum number. It is appreciated that the number set for S can be any value set into the drowsy driver detection system. It is appreciated that the value S is in some way proportional or related by proportion to the angle of incidence θ. However, it is further appreciated that this proportional relationship may or may not be a direct proportional relationship. As such, the relationship between S and θ may be any suitable mathematical relationship in the determination of the drowsiness index. It is further appreciated that for greater incidence angles θ, greater rate of changes of the incident angle θ, etc., the larger the value $S_i$ for a given violation that is recorded. As such, the greater the severity S the greater the effect S has on the total drowsiness index D, summed over time, for a given lane violation V=1. Therefore, for a given time interval T, D can be compared to a predetermined value. If the drowsiness index D exceeds this predetermined value over the time interval T, then the drowsy driver detection system can respond in a variety of ways.

In exemplary embodiments, given an excess of the drowsiness index, D, the onboard warning system 15 can be activated as discussed above, with increasing, warning as the severity of the lane violation increases. For example, a visual light, a shaking of the handwheel, a shaking of the car seat, etc. In a further example, the color of the warning lights can change from amber for a certain severity to red for increased severity. Similarly, the frequency and amplitude of the audible warning signals can change and increase for increased severity of the lane violation.

In exemplary embodiments, with increasing severity of the lane violations and for a value exceeding the predetermined drowsiness index, a call can be automatically initiated to the human intervention system 21. In exemplary embodiments, the human intervention can make a call via a satellite system 23. A trained operator 25 can determine an actual risk associated with a particular driver of vehicle 1. The operator 25 may decide to consult with the driver to take a break from driving, suggesting attending a nearby coffee shop or restaurant. For increased risk, the operator 25 may further decide to contact law enforcement, relaying the position of the vehicle, for example, by the GPS system 40. In further exemplary embodiments, other actions can be implemented, such as immobilizing the vehicle 1.

It is appreciated that the systems and methods described herein can also be activated for instances of increasing severity $S_i$ or for single instances of severity that occur once, but that exceed an acceptable severity for a single instance. In addition, a sever lane violation could occur without V=1 because the operator may have had a correction before the vehicle had exceeded the minimum distance δ from the lane marker 2. However, this instance may still warrant the onboard warning system 15 to generate warning signals. Although the drowsiness index is summed over time indicating an increased danger of drowsiness, single instances of lane violation severity can also indicate drowsiness or other dangerous operating conditions for which the onboard warning system 15 can be activated. For example, if several instances of severity $S_i$ that exceed predetermined thresholds occur, but that do not result in the drowsiness index exceeding the predetermined threshold, certain of the above-described activations can occur, such as a lower initiation of warning signals, mild lane-keeping, etc.

In exemplary embodiments, it is appreciated that lane deviations with the usage of turn signals, or momentary data outliers do not constitute of a lane violation, and thus, V=0. As such, in such non-violation situations, the drowsy driver detection system can calculate a distance between a center of a vehicle and a center of a lane determine a discontinuity in the calculation of the distance between the center of the vehicle and the center of a lane, and enable a torque correction to compensate for the discontinuity. The drowsy driver detection system can further disengage a lane keeping torque in response to detecting a lane change, calculate a time period, and reengage a lane keeping torque in response to the expiration of the time period. It is thus appreciated that the systems and methods described herein implement LK systems.

It is appreciated that the drowsy driver algorithms, LK algorithms and other algorithms described herein, as well as data collected from the camera system 22 can be stored in storage media 50, which can be volatile or non-volatile. As such, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

Figure 2:
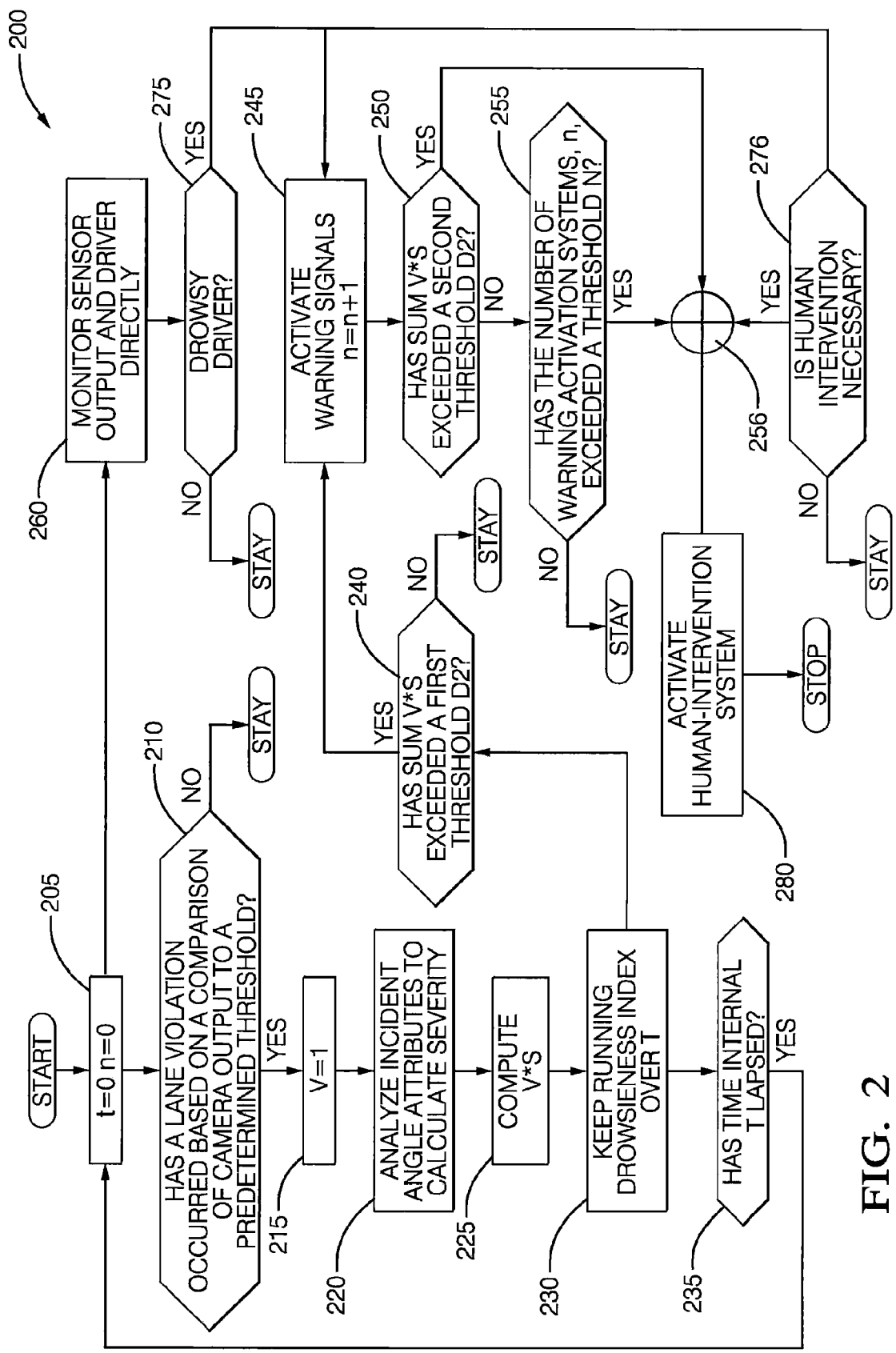
FIG. 2 illustrates a flow chart of a drowsy driver detection method.

The drowsy driver detection methods and systems described herein as well as the lane violation detection and LK systems described herein can be implemented in a variety of ways. FIG. 2 illustrates a flow chart of a drowsy driver detection method 200 illustrating an example of the systems and methods described herein. In exemplary embodiments, the method 200 is performed through a triggered subsystem, in which a trigger occurs in response to a lane violation. The method 200 can be initiated by setting a time interval t=0 at step 205. Furthermore, a number of warning system activations index n, described further herein can be initialized to 0. In exemplary embodiments, it is appreciated that n and t are initialized to 0 at the same step. In other exemplary embodiments, n can be reset to 0 at step 255 discussed further below. It is further appreciated that n may be rest to 0 upon the expiration of a time period T2 indicating that a time period has ended in which any warning system violations have occurred. In further exemplary embodiments, n may be reset to 0 upon ignition of the vehicle 1, or when the vehicle speed falls below a certain predetermined threshold.

Referring still to FIG. 2, as the time interval is indexed, lane violations can be detected at step 210. As described above, the detection of a lane violation occurs when the vehicle 1 approaches a lane marker 2 below a distance $\delta$ as compared to a predetermined value. If a lane violation has occurred at step 210, then the lane violation can be set as V=1 at step 215. When a lane violation is detected at step 210, the attributes $\theta$ incident angle can be analyzed to calculate the severity S of the lane violation V at step 220. In exemplary embodiments, the attributes of the incidence angle $\theta$ can include the value of the incident angle $\theta$ as well as the derivative of the incident angle $\theta$. At step 225 the value V*S is computed and stored in the storage media 50. At step 230, the running sum of V*S is kept over time T and stored in the storage media 50. At step 235, it is determined whether or not a time interval T has elapsed (i.e., t=T). If the time interval T has not lapsed yet, then further lane violations are detected at step 210. If no lane violation occurs at step 210, the method 200 remains idle until triggered as discussed above. In exemplary embodiments, the drowsiness index is checked to see if the predetermined value has been exceeded at step 240. In exemplary embodiments, a first threshold D1 is checked to see if this predetermined value has been exceeded. If the predetermined value has not been exceeded at step 240, then the method 200 can remain idle until once again triggered. If however, the drowsiness index has exceeded the predetermined value at step 240, then the onboard warning system 15 can initiate warning signals at step 245, in which the index value n is indexed by 1. At step 250, a second predetermined value, threshold D2 is checked to see if it has been exceeded. If the value has been exceeded at step 250, then the method notes the "yes" at an "or" junction 256. If the value has not been exceeded at step 250, then the method 200 determines if the number of warning system activations, n has exceeded a predetermined threshold. N at step 255. If the number of warning system activations n has not exceeded the threshold N, then the method 200 remains idle until triggered as discussed above. If the number of warning system activations has been exceeded, then the method 200 records the "yes" at the "or" junction 256. If there is a "yes" recorded at "or" junction 256, then the method 200 can further activate the human intervention system 21 at step 280. It is appreciated that if there is a "yes" at the "or" junction 256, human intervention is necessary.

Referring still to FIG. 2, it is appreciated that a drowsy driver condition may still occur without lane violations V and without great angles of incidence, $\theta$. As such, the method 200 can further exploit the onboard warning system 15 as described above, such as by actively monitoring the direct sensor (e.g. eyelid monitoring) output and the driver at step 260. If any of the sensors at step 260 indicate a drowsy driver at step 275, then the onboard warning system 15 can be activated at step 245, which further indexes the number of warning system activations. Furthermore, if any of the sensors detect a severe drowsy driving condition via direct measurements, then the method 200 can determine whether human intervention is necessary at step 276. As discussed above, if it is determined that human intervention is necessary at step 276, then the "yes" can enter an "or" junction 256. If it is determined that there is no human intervention necessary at step 276, then the method 200 remains idle until triggered as discussed above. If a drowsy driver is not detected at step 275, then the method 200 remains idle until triggered as discussed above.

The disclosed systems and methods can be embodied in the form of computer or controller implemented processes and apparatuses for practicing those processes. It can also be embodied in the form of computer program code containing instructions embodied in tangible media, such as floppy diskettes. CD-ROMs, hard drives, or any other computer-readable storage medium, wherein, when the computer program code is loaded into and executed by a computer or controller, the computer becomes an apparatus for practicing the method. The method may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the method. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated. It is further appreciated that references to left and right as well as number used for logic can be interchanged and used otherwise in other implementations.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method, comprising:
   determining that a vehicle has engaged in a lane violation;
   determining a severity of the lane violation;
   determining a frequency of lane violations in a time interval T;
   determining a drowsy driver condition of the vehicle as a function of the severity of the lane violation and the frequency of lane violations; and
   responding to the drowsy driver condition;
   wherein determining the drowsy driver condition, comprises, for the time interval T:
   calculating lane violation values; and
   calculating corresponding severity of lane violation values;

and summing the products of the lane violation values and the severity of lane violation values over the time interval T.

2. The method as claimed in claim 1 wherein the lane violation is determined by calculating a distance between the vehicle and a lane marker.

3. The method as claimed in claim 2 wherein the lane violation occurs when the distance between the vehicle and the lane marker is at least one of equal to or less than a predetermined distance.

4. The method as claimed in claim 1 wherein the severity of the lane violation is determined by analyzing an angle of incidence between the vehicle and a lane marker.

5. The method as claimed in claim 1 wherein the severity of the lane violation is determined by analyzing the rate of change of an angle of incidence between the vehicle and a lane marker.

6. The method as claimed in claim 1 further comprising comparing the sum of the products of the lane violation values and severity of the lane violation values to a first predetermined drowsy driver index.

7. The method as claimed in claim 6 further comprising engaging vehicle warning systems in response to the sum of the products of the lane violation values and severity of lane violation values at least one of equaling the first predetermined drowsy driver index and exceeding the first predetermined drowsy driver index.

8. The method as claimed in claim 7 further comprising comparing the sum of products of the lane violation values and severity of the lane violation values to a second predetermined drowsy driver index.

9. The method as claimed in claim 8 further comprising engaging a human intervention system in response to the sum of the products of the lane violation values and severity of lane violation values at least one of equaling the second predetermined drowsy driver index and exceeding the second predetermined drowsy driver index.

10. The method as claimed in claim 9 further comprising engaging a human intervention system in response to a predetermined number of warning system activations being exceeded.

11. The method as claimed in claim 1 wherein responding to the drowsy driver condition comprises engaging vehicle warning systems in response to the detection of a drowsy driver.

12. A drowsy driver detection system comprising:
a computer processor;
a computer program product including instructions for causing the computer processor to implement a method, the method comprising:
determining that a vehicle has engaged in a lane violation;
determining a severity of the lane violation;
determining a frequency of lane violations in a time interval T;
determining a drowsy driver condition of the vehicle as a function of the severity of the lane violation and frequency of lane violations; and
responding to the drowsy driver condition;
wherein determining the drowsy driver condition, comprises, for the time interval T:
calculating lane violation values; and
calculating corresponding severity of lane violation values; and
summing the products of the lane violation values and the corresponding severity of lane violation values over the time interval T.

13. The drowsy driver detection system of claim 12 wherein the lane violation is determined by calculating a distance between the vehicle and a lane marker.

14. The drowsy driver detection system of claim 12 wherein the lane violation occurs when the distance between the vehicle and the lane marker is at least one of equal to or less than a predetermined distance.

15. The drowsy driver detection system of claim 12 wherein the severity of the lane violation is determined by analyzing an angle of incidence between the vehicle and a lane marker.

16. The drowsy driver detection system of claim 12 wherein the severity of the lane violation is determined by analyzing the rate of change of an angle of incidence between the vehicle and a lane marker.

17. The drowsy driver detection system of claim 12 wherein the method further comprises comparing the sum of the products of the lane violation values and severity of lane violation values to a predetermined drowsy driver index.

18. The drowsy driver detection system of claim 17 wherein the method further comprises engaging vehicle warning systems in response to the sum of the products of the lane violation values and severity of lane violation values at least one of equaling the predetermined drowsy driver index and exceeding the predetermined drowsy driver index.

19. The in drowsy driver detection system of claim 18 wherein the method further comprises comparing the sum of products of the lane violation values and severity of the lane violation value to a second predetermined drowsy driver index.

20. The drowsy driver detector system claim 19 wherein the method further comprises engaging a human intervention system in response to the sum of the products of the lane violation values and severity of lane violation values at least one of equaling the second predetermined drowsy driver index and exceeding the second predetermined drowsy driver index.

21. The drowsy driver detection system of claim 20 wherein the method further comprises engaging a human intervention system in response to a predetermined number of warning system activations being exceeded.

22. The drowsy driver detection system of claim 12 wherein responding to the drowsy driver condition comprises engaging vehicle warning systems in response to the detection of a drowsy driver.

23. A system, comprising:
a computer processor;
a drowsy driver detection process residing on the processor and having instructions to:
determine that a vehicle has engaged in a lane violation;
determine a severity of the lane violation;
determine a frequency of lane violation in a time interval T;
determine a drowsy driver condition of the vehicle as a function of the severity of the lane violation and the frequency of lane violations; and
respond to the drowsy driver condition;
wherein determining the drowsy driver condition, comprises, for the time interval T:
calculating lane violation values; and
calculating corresponding severity of lane violation values; and
summing the products of the lane violation values and the corresponding severity of lane violation values over the time interval T.

24. A system comprising:
a computer processor;
a drowsy driver detection process residing on the processor and having instructions to:
determine that a vehicle has engaged in lane violation;
determine a severity of the lane violation;
determine a drowsy driver condition of the vehicle; and
respond to the drowsy driver condition;

the process further has instructions to determine a drowsy driver index, D, given by:

$$D = \sum_{i}^{T} Vi * Si$$

where Vi is a lane violation value having values $V_i=0$ and $V_i=1$ for a no lane violation condition and for a lane violation condition respectively, a lane violation condition occurring when a distance between the vehicle and a lane marker falls below a first predetermined value, where $S_i$ is a severity of a lane violation and being proportional to an angle of incidence between the vehicle and the lane marker, where the product $V_i*S_i$ is summed over a time interval T.

* * * * *